United States Patent
Zayas

(10) Patent No.: US 7,099,108 B2
(45) Date of Patent: Aug. 29, 2006

(54) SYSTEMS AND METHODS FOR SELF-SERVOWRITING WITH IMPROVED RETRY POSITION OF WEDGES

(75) Inventor: Fernando A. Zayas, Loveland, CO (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/003,753

(22) Filed: Dec. 3, 2004

(65) Prior Publication Data
US 2006/0119972 A1 Jun. 8, 2006

(51) Int. Cl.
*G11B 21/02* (2006.01)
(52) U.S. Cl. .................................................. 360/75
(58) Field of Classification Search ............ None
See application file for complete search history.

(56) References Cited

U.S. PATENT DOCUMENTS 6,304,407 B1 * 10/2001 Baker et al. ................ 360/75
6,519,107 B1 * 2/2003 Ehrlich et al. ............... 360/75
6,704,156 B1 * 3/2004 Baker et al. ................ 360/75
6,885,513 B1 * 4/2005 Baker ........................ 360/17

* cited by examiner

*Primary Examiner*—K. Wong
(74) *Attorney, Agent, or Firm*—Fliesler Meyer LLP

(57) ABSTRACT

The initial attempt to servowrite a wedge in the final pattern may fail due to disk defects and a retry of servowriting the failed wedge is usually attempted. The current invention shifts the position of the final wedge during at least one such servowriting retry attempt. Since a final wedge position different from a previous self servowriting attempt is adopted, potential defects on the surface of the media can possibly be avoided and the success rate of the servowriting retry attempt can be improved. In practice, this involves carrying a count of failed wedges during the servowrite process and if it exceeds a threshold level, then the wedge pattern is shifted in position and the servowrite process starts again. This can be repeated for many shift positions. This description is not intended to be a complete description of, or limit the scope of, the invention. Other features, aspects, and objects of the invention can be obtained from a review of the specification, the figures, and the claims.

22 Claims, 10 Drawing Sheets

US 7,099,108 B2

SYSTEMS AND METHODS FOR SELF-SERVOWRITING WITH IMPROVED RETRY POSITION OF WEDGES

INCORPORATION BY REFERENCE

This application is related to the following patent which is hereby incorporated by reference in its entirety:

U.S. Pat. No. 6,738,205, SELF-WRITING OF SERVO PATTERNS IN DISK DRIVES, Inventors: Patrick Moran et al., filed on Jul. 8, 2001.

FIELD OF THE INVENTION

The present invention relates to the writing of position information to rotatable media.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives. While good for the consumer, this density increase creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

DETAILED DESCRIPTION

Figure 1:
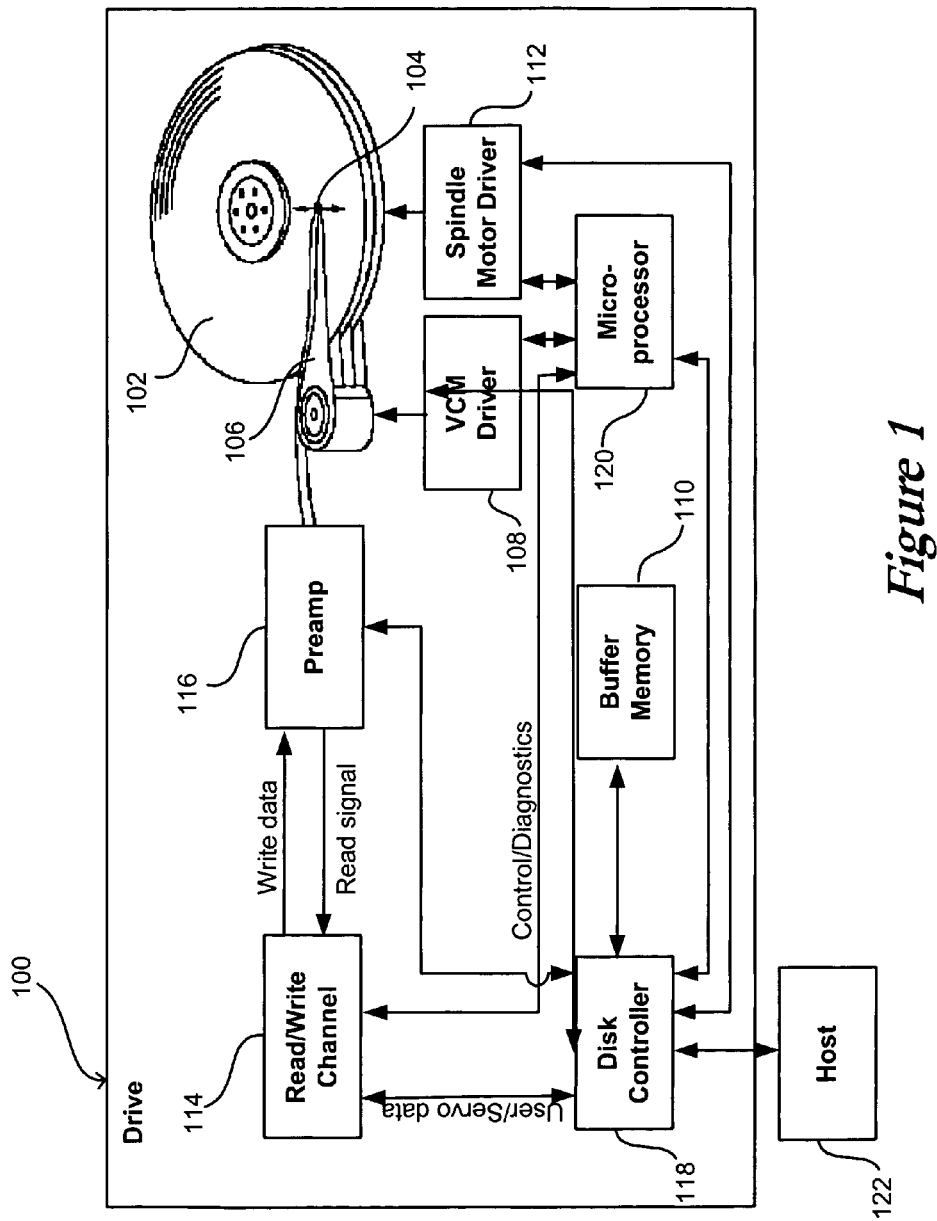
FIG. 1 is a diagram showing components of an exemplary drive system that can be used in accordance with various embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
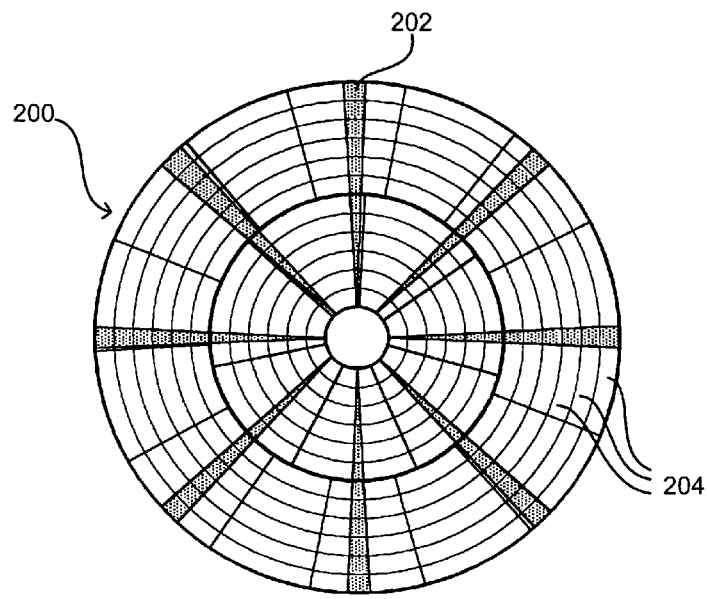
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. A measure of the position of a head or element, such as a read/write head or element, relative to the center of a target track, will be referred to herein as a position-error signal (PES).

Figure 3:
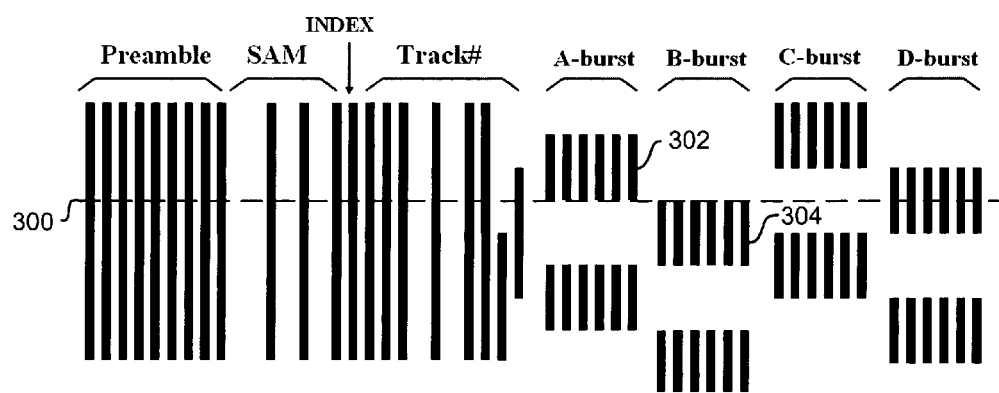
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. As a non-limiting example, a centerline defined by four bursts can be referred to as "4-burst-centerline" as described for example, in U.S. Pat. No. 5,381,281 entitled "Disk Drive System Using Multiple Embedded Quadrature Servo Fields", by Louis J. Shrinkle, et al, filed Jun. 24, 1993. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention A problem that exists in the reading and writing of servo information such as servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as "written-in runout." Written-in runout can be thought of as the offset between the actual centerline, or desired radial center, of a track and the centerline that would be determined by a head reading the written servo pattern. Written-in runout can lead to servo performance problems, wasted space on a disk and, in a worst case, unrecoverable or irreparably damaged data.

Additional servowriting steps can be used when writing servo information. The use of additional servowriting steps for the writing and/or trimming of servo burst patterns, for example, can provide for a low written-in runout in a servo pattern, but at the cost of some time-penalties in the servowriting and/or self-servowriting operations.

FIGS. 4(a)–4(f) depict the progression of several servowriting steps of an exemplary servowriting process. The pattern shown in these figures is commonly referred to in the industry as a 3-pass-per-track, trimmed-burst pattern, for reasons described below. Using the nomenclature of this document, one could refer to the pattern as a "3-servowriting-step-per-track, trimmed-burst" pattern. Each figure depicts a small portion of the surface of a disk. This portion can contain several servo tracks, extending radially on the disk and vertically in the figures, and can cover the space of a single servo wedge, circumferentially on the disk and horizontally in the figures. A typical drive can have tens of thousands of servo tracks, and over one hundred wedges per revolution. In the figures, the black areas indicate portions of the surface of the disk that have been magnetized in one direction. The white areas have been magnetized in another direction, typically in a direction opposite to that of the patterned areas. For a drive that uses longitudinal recording, the two directions can be in the positive and negative circumferential directions. For a drive that uses vertical recording technology (also sometimes referred to in the industry as "perpendicular recording"), the two directions can be perpendicular to the recording surface, such as would be "in" and "out" of the page for the illustrations of FIGS. 4(a)–(f). These simplified figures do not show effects of side writing of the write element, which can produce non-longitudinal magnetization and erase bands. Such effects are not of primary importance to the discussion herein.

Figure 4A:
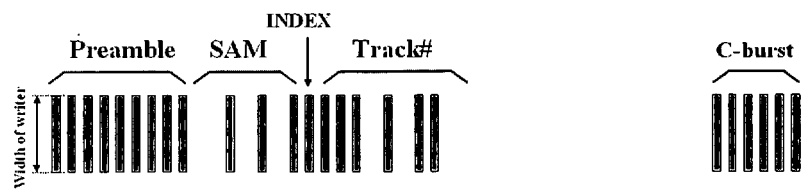
FIGS. 4(a)–(f) are diagrams of a servo-burst pattern being written over a progression of servowriting steps.

In FIG. 4(a), the result of a single servowriting step is shown. From that step, the servowriting head (passing from left to right in the figure) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4(a). An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head (note that the bits representing the track number shown here are for illustration purpose only, a typical drive may have up to 18 or more track number bits). Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information. The width of the written track can be determined by the magnetic write-width of the write element of the servowriting head.

Figure 4B:
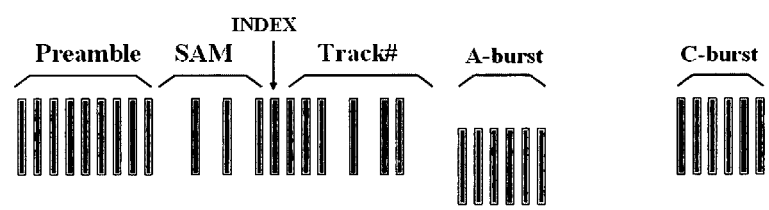

FIG. 4(b) shows the result of a second servowriting step of the servowriting head. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
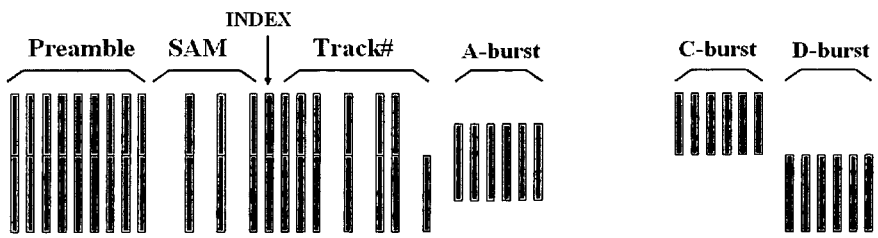

FIG. 4(c) shows the magnetization pattern after three servowriting steps of the servowriting head. The new portion of the pattern has been written with the servowriting head displaced another half servo track radially, for a total displacement of one servo-track, or two-thirds of a data-track, from the position of the head during the first servowriting step. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. As long as the servowriting head is at least two-thirds of a data-track in radial extent, the digital information will extend across the entire radial extent of the servo-written pattern. This trimming of the C-burst and writing of the D-burst created a common edge position or "boundary" between the two bursts.

Figure 4D:
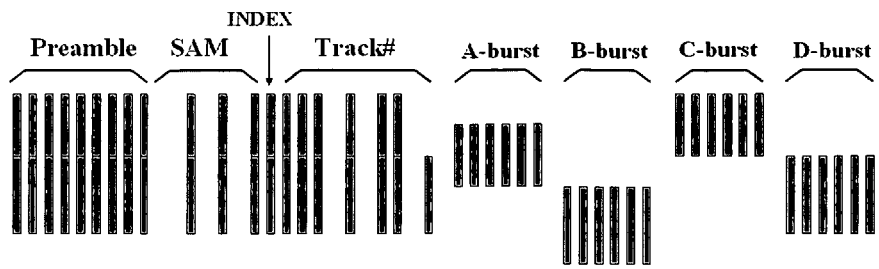

In FIG. 4(d), a B-burst has been added and the A-burst trimmed in the fourth servowriting step of the servowriter. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, a negative PES might indicate that the amplitude read from the A-burst is greater than the amplitude read from the B-burst. In this case, the head is too far above the center position (using the portion of the pattern in the figure) and should be moved radially downward/inward until the PES signal is approximately 0. It should be noted that for other portions of the pattern a B-burst could be above an A-burst, resulting in a smaller amplitude contribution coming from the A-burst when the head is too near the outer diameter of the disk.

Figure 4E:
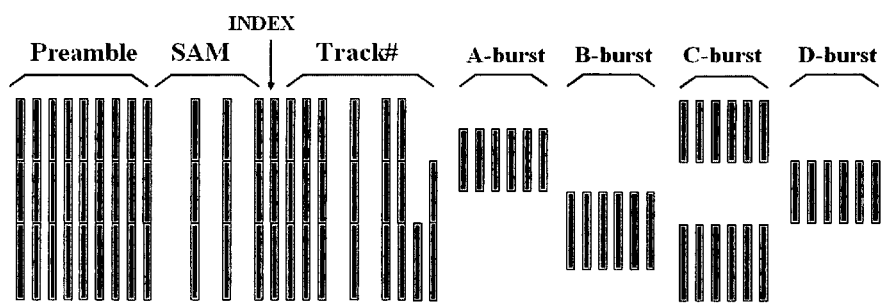
Figure 4F:
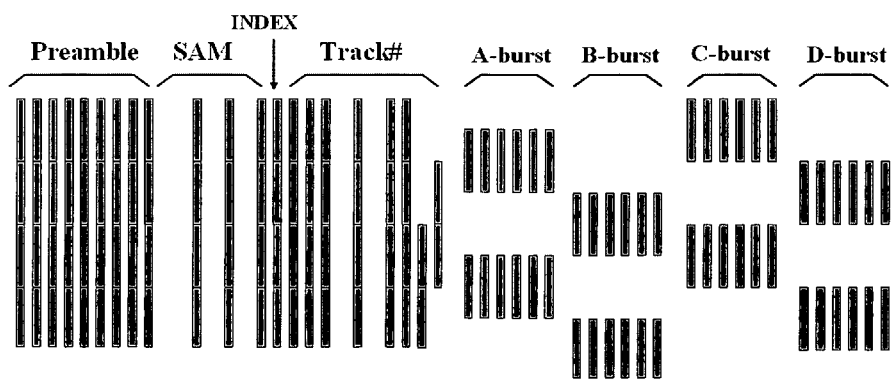

FIGS. 4(e) and 4(f) show the results of subsequent steps of the servowriting process, which has produced a number of servo tracks. After the first step in this process, each subsequent step writes one servo burst in a wedge and trims another. Every second step also writes digital information, including the SAM and track number. Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each step typically takes one or two full revolutions to write all of the wedges in that pass. It is possible that completing the burst writing and trimming for a single servowriting step can take more than two revolutions, but a maximum of two revolutions (one to write the new burst, and another to trim a previously-written burst) will be considered for the discussion below.

Using such an algorithm, servowriting can take about 1.25–2.5 revolutions per servowriting step. Since there are two servowriting steps per servo-track in this example, and 1.5 servo tracks per data-track, such a process requires 3 servowriting steps per data-track, or 3.75–7.5 revolutions per data-track. For purposes of subsequent discussion only, it will be assumed that the process takes 4 revolutions per data-track (a relatively low bound).

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting. A typical replication process, in which a drive servos on the reference pattern and writes final servo patterns on all surfaces, can take place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk (as described for example, in U.S. Pat. No. 6,631,046 entitled "Servo Track Writing Using Extended Copying with Head Offset"). In this type of self-servowriting operation, previously written tracks can later serve as reference tracks.

Many self-servowriting techniques require considerably more than four disk revolutions per data-track written, as the drive must spend considerable time before each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular. The information used to remove written-in runout from the track can be calculated in one approach by examining a number of parameters over a number of revolutions. These parameters can include wedge offset reduction field (WORF) data values calculated by examining the measured PES over a number of revolutions of a track, as well as the servo loop characteristics. A measurement can be made to characterize servo loop characteristics, which can be combined with the observed PES in order to determine the written-in runout of the reference track. Because the servo typically suffers both synchronous and non-synchronous runout (sometimes referred to in the industry as "repeatable" runout (RRO) and "non-repeatable" runout (NRRO), respectively), any measurement intended to determine the synchronous runout can be affected by the non-synchronous runout. If many revolutions of PES data are observed and combined (one possible approach to combine is to synchronously average the PES data, another possible approach is outlined in U.S. Pat. Nos. 6,069,764, 6,437,936, 6,563,663 and 6,449,116), the effects of the non-synchronous runout can lessen, leaving substantially only synchronous runout. Observing many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive controller memory for immediate use. During a self-servowriting operation, the drive may use the latter option by measuring the written-in runout on a reference track and applying it to the servo by the use of a table in controller memory. Additional revolutions of PES measurements for the reference track can be used to reduce the effects of non-synchronous runout.

As previously described, techniques for determining and removing written-in runout of a track will hereinafter be referred to as WORF technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

In various embodiments of the present invention, the reference pattern can be, but is not limited to, a printed media servo pattern, or a spiral pattern. The spiral pattern is discussed in details in U.S. Pat. No. 5,668,679 entitled "System for Self-Servowriting a Disk Drive", by Paul A Swearingen, et al, filed Dec. 21, 1995. The printed media servo pattern will be utilized to illustrate the present invention in the following discussions.

Figure 5:
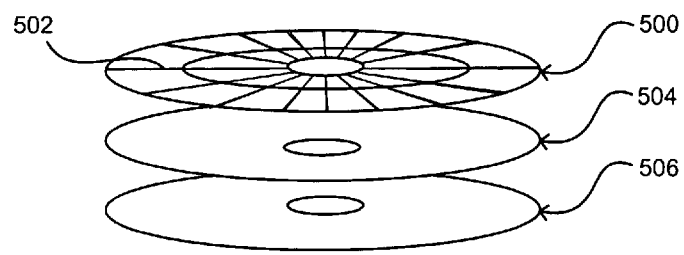
FIG. 5 is a diagram of a disk stack containing a printed reference pattern that can be used with the system of FIG. 1.
Figure 10:
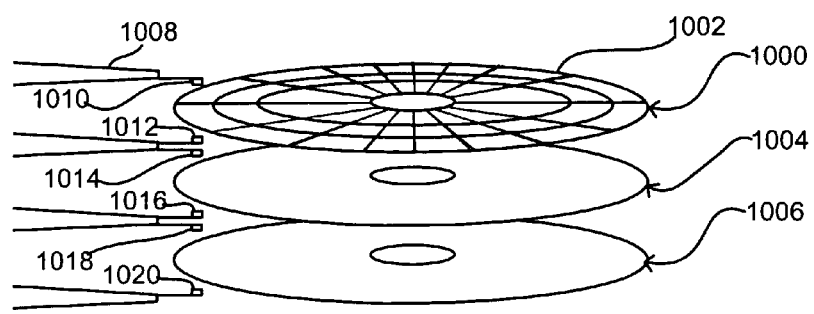
FIG. 10 is a diagram showing a reference pattern in a disk stack that can be used in the system of FIG. 1.
Figure 11:
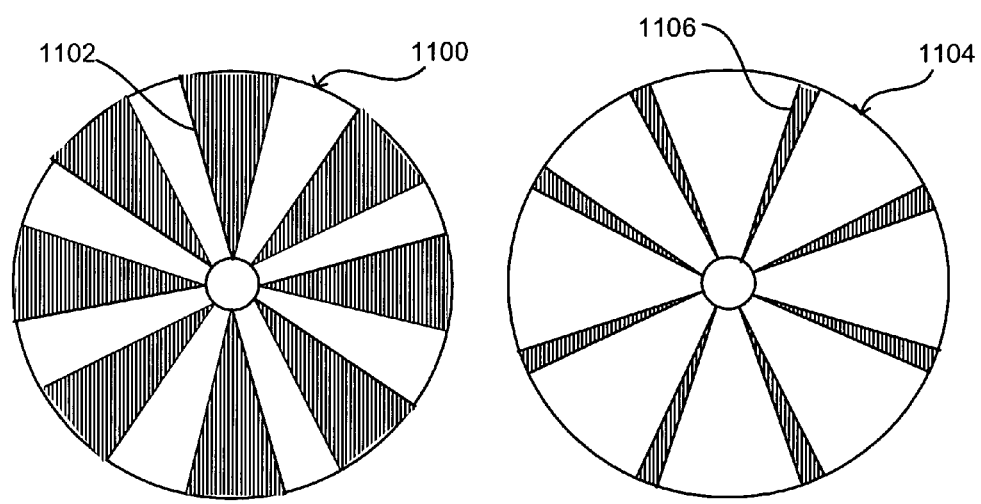
FIG. 11 is a diagram showing a printed reference pattern and a final pattern that can be used with the system of FIG. 1.

In a drive system that can be used in accordance with embodiments of the present invention, a surface of a magnetic disk 500 can contain a printed magnetic pattern 502. That magnetic disk can be placed in a drive that may contain other magnetic disks 504, 506 in a disk stack, such as the example stack shown in FIG. 5. The surface of the disk 500 having the printed magnetic pattern 502 can be used as a reference to replicate the printed pattern 502 to any other disk surface in the drive. The printed pattern can be used as a reference for information such as timing information, circumferential position information, and/or radial position information for the disk. The use of a printed media pattern as a reference pattern can allow for a reasonable reduction in any repeatable runout written to the reference pattern by reading the printed signal pattern, perhaps over a number of revolutions at each radial location, and calculating the runout. The drive system can then adjust the read/write head position to compensate for the perceived PES obtained from the reference surface in order to effectively remove the runout when replicating the servo pattern. In some embodiments the runout may not be completely removed, but may be adjusted or modified to a pre-determined amount and/or pattern. Note however that it is not necessary for the printed surface to be at one end or the other of the disk-stack as shown in FIG. 5. In fact, it may be desirable to place the printed surface near to the middle of the stack in order to minimize the maximum offset between the head-radius on the reference-surface and that on other surfaces (due to, for example, tilt and other factors). The same applies to FIG. 10 discussed later.

Figure 6:
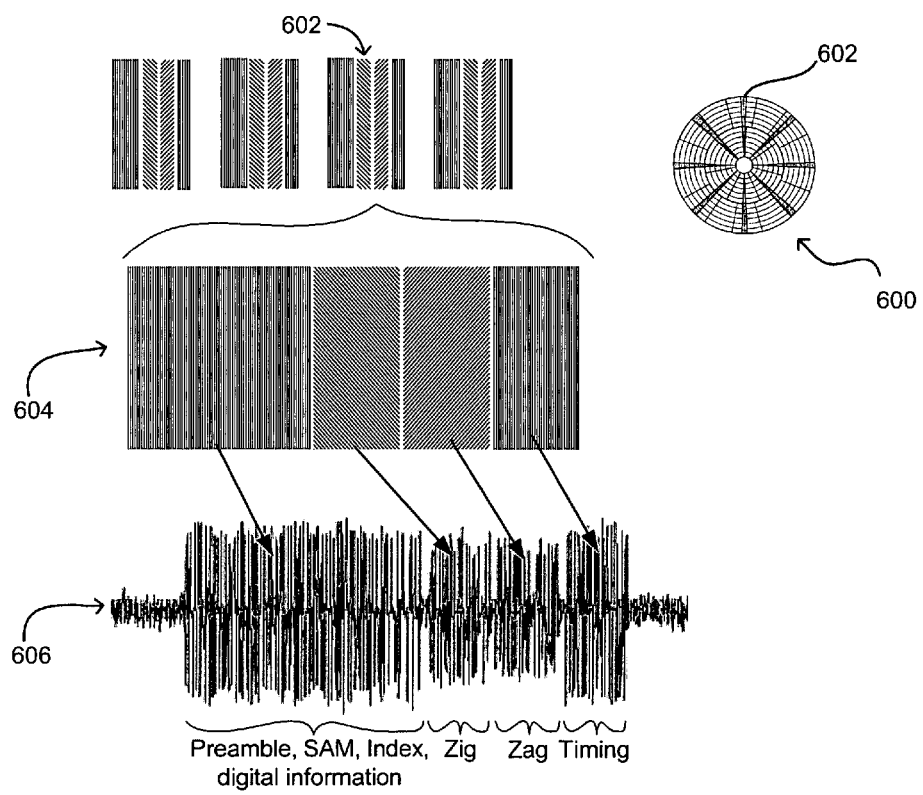
FIG. 6 is a diagram showing various views of portion of a magnetic pattern that can be used with the system of FIG. 1.

FIG. 6 shows an exemplary printed signal pattern that can be used in accordance with embodiments of the present invention, such as in the exemplary disk stack of FIG. 5. The pattern may include one or more servo wedges, and FIG. 6 shows a reference signal for servo information corresponding to a servo wedge 602 on a disk 600. The signal is shown in a variety of formats. An expanded view 604 of the exemplary magnetization pattern is shown including information for the wedge 602, followed by a signal 606 that could be generated by reading the pattern for the wedge 602. As shown in the Figure, the printed signal pattern contains a preamble, followed by a servo address mark (SAM), and then an Index-mark. Following the Index-mark is a pattern portion referred to as a "zig," a portion referred to as a "zag," and a timing burst.

Figure 7:
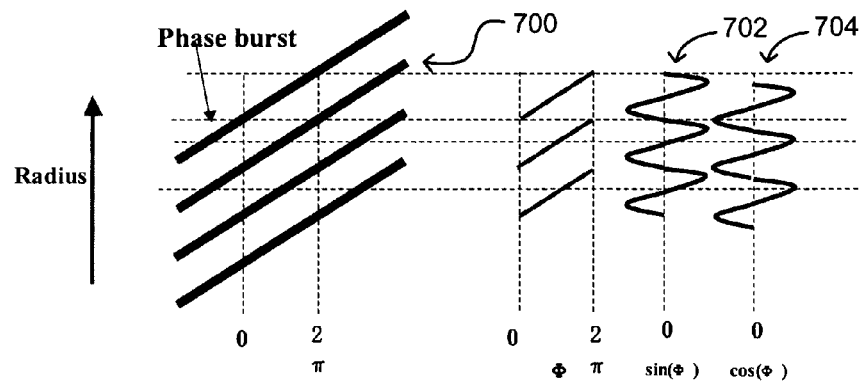
FIG. 7 is a diagram showing a phase burst and corresponding read signals that can be used with the system of FIG. 1.

FIG. 7 shows a close-up view of an exemplary "zag" phase burst 700. On a local scale, a read element may pass horizontally (in the Figure) across the burst 700. A read/write channel can read such a burst and return both a sine or "real" value 702 and a cosine or "imaginary" value 704. The phase of the burst can then be calculated as:

$$\text{Phase} = \arctan\left(\frac{\sin\phi}{\cos\phi}\right)$$

In the "zag" displayed, the magnetization pattern is slanted relative to both the radial direction (vertical in the Figure) and the circumferential direction (horizontal in the Figure). When a read element passes over the slanted burst, the time at which the element encounters the transitions in the burst can be used to determine the radial position of the element. For instance, the "higher up" the read element is in the Figure, or more toward the outer diameter (OD) of the drive, the later the phase transitions are encountered, or the more delayed the phase of the signal. The phase determination can be simplified using both a "zig" and a "zag," or regions with different or opposite slants or phases, such that the relative phase between the two can be examined, wherein the angles of the zig and zag do not have to be exactly opposite of one another. In this way, absolute phase is not an issue as the drive system can look at the relative phase of the two bursts and can get the radial position for each cycle. If the drive goes through multiple cycles, the drive can track the number of cycles encountered while traversing the disk surface from a known reference-point, as disclosed in U.S. patent application Ser. No. 10/732,638, entitled "Methods for Improving Printed Media Self-servo Writing", by Richard Ehrlich, filed Dec. 10, 2003.

Figure 12:
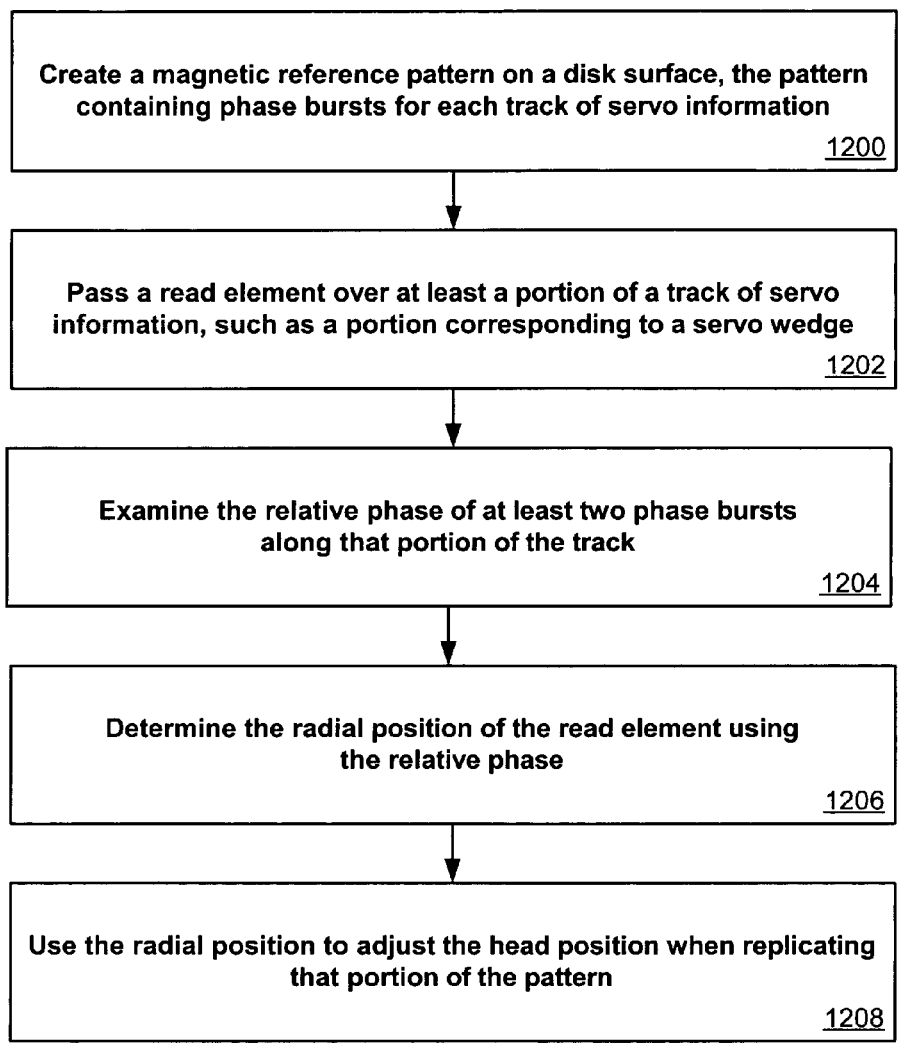
FIG. 12 is a flowchart showing a process that can be used with the system of FIG. 1.

One such process is shown in the diagram of FIG. 12. In such a process, a magnetic pattern is created on a disk surface, such as by printing or servowriting, which contains phase bursts for each track of servo information at step 1200. The phase bursts can include zig and zag bursts, and can be included for each or any wedge in the magnetic pattern. A read element, such as on a read/write head, can be passed over at least a portion of a track of servo information, such as a portion corresponding to a servo wedge at step 1202. The relative phase of at least two phase bursts, such as a zig and a zag for a wedge along a track, can be examined at step 1204. The radial position of the read element relative to the magnetic pattern can be determined using the relative phase at step 1206. The radial position can be used to adjust the head position(s) when replicating that portion of the pattern, either to the same surface or to any other surface in a drive or disk stack at step 1208. For instance, if the radial position of a burst for a wedge is too far towards the outer diameter of the pattern, that burst can be moved toward the inner diameter of the pattern when replicated. Several passes of the head over the pattern can be taken to reduce the error in the radial position determination.

Certain processes can be executed initially to determine the runout, as it may be desirable to remove the runout, lessen the amount of runout, or alter the runout to a desired amount. Utilizing WORF calculations is one approach that can be used to determine the amount of runout by taking into account the servo characteristics and determining how much runout was present before the servo tried to remove the runout. After the runout is measured, the amount of runout can be determined and removed.

When decoding phase bursts, a drive system can use an algorithm that takes an arc tangent of the real and imaginary parts of a discreet Fourier transform of the burst signal. Existing channels are capable of sampling the signal and doing a discreet Fourier transform. One such discreet Fourier transform that can be used is given as follows:

$$F_k = \sum_{n=0}^{N-1} f_n e^{-j2\pi k \frac{n}{N}}$$

Figure 8:
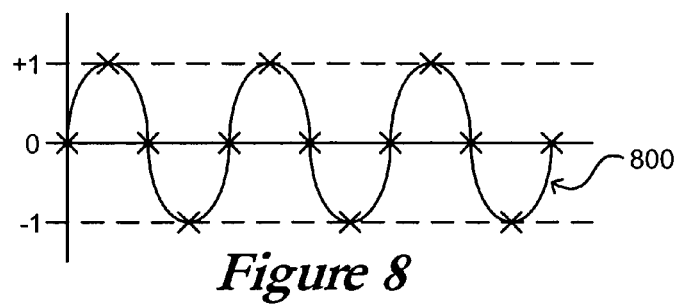
FIG. 8 is a plot showing an exemplary sampling approach that can be used with the signals of FIG. 6 and FIG. 7.

In this equation, $f_n$ is the sequence in time and $F_k$ is the Fourier component in frequency space. This "complex" math can be simplified in at least a few situations. For example, a signal can be examined at one quarter of the sample rate. The signal can also be examined at up to one half the sample rate using a Nyquist theorem-based approach. These samples can be taken at any appropriate location or interval, such as at or between signal peaks, etc. If the signal 800 is examined at one quarter the sample rate, as shown in FIG. 8 with an "x" marking each sample location, the coefficients are either +1, 0, or −1. In this case, the real part of the Fourier transform multiplies the signal by +1, 0, −1, 0, . . . and the imaginary part multiplies the signal by 0, +1, 0, −1 . . . , the imaginary part being offset by one sample from the real part. Therefore, each sample is adding to, subtracting from, or not affecting the result. An alternative approach is to use coefficients of +1, −1, −1, and +1 for the real part, and +1, +1, −1, −1 for the imaginary part, which can provide for greater immunity to noise since all samples will contribute to the sum. The discreet Fourier transform can then be reduced to an "adder" with no multiplication. A discreet Fourier transform of the signal then can be broken down into real and imaginary parts, which can each be squared and added together. The square root of this sum yields the magnitude of the signal. Alternatively, a ratio of the real and imaginary parts can be taken, and an arctangent of the ratio can yield the phase, such as using the arc tan equation given above. Using the phase, the system can determine the radial position.

In some drives, it may be necessary to erase any pre-existing "final wedges" or any signals in the final-wedge area. Such an erase procedure can be used, for example, on a "virgin" drive or for a re-scan in a self-test process. In a virgin drive, or a drive to which no data has been written, it can be desirable to erase the final wedge area to ensure that no signal exists on the surface of the disk. An erase final wedge process can be run on all cylinders in a drive.

Figure 9:
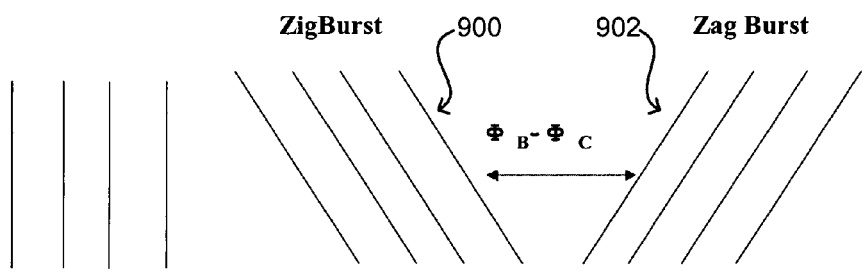
FIG. 9 is a diagram showing relative burst phases that can be used with the system of FIG. 1.

After running WORF calculations on a reference track, the measured position can be calculated. In one embodiment, as shown in FIG. 9, the phase of the "zig" burst 900 and the phase of the "zag" burst 902 can be measured. The difference between the phases can be multiplied by a number of tracks per cycle to obtain the measured radial position. For example, one way to calculate the measured position from the relative phases of the bursts can utilize a formula such as:

Measured Position=tracksPerCycle*(Φzig−zag)

where Φzig can be a function of the phase for the "zig" burst covering both linear and non-linear uses of the burst-phase. In some embodiments, Φzig (and/or Φzag) may also be functions of the overall radial position. That is, they may vary across the stroke of the drive, according to the parameters of the printed pattern.

A position error signal (PES) then can be calculated for each wedge. PES can be a function of the location of a read/write head or element relative to a disk surface. Once a write element is at the proper radial location, or within acceptable radial boundaries, the final wedges can be written. Wedges can be written using an approach such as a "stagger" approach or a "concurrent" approach. For example, in one such system a pre-amplifier allows concurrent writing to all heads, or some of the heads, in a drive. If the drive system does not contain such a pre-amplifier, a final wedge can be written for one head. The drive can then switch heads and write for another head, or for a group of heads. This "stagger" approach may require the drive system to know, and be able to deal with the fact, that wedges are offset in time for certain heads.

Retry Servowriting Wedges

The initial attempt to servowrite a wedge in the final pattern may fail and a retry of the servowriting of the failed wedge is usually attempted. One potential reason for the failure of the initial servowriting attempt is the possible defects on the surface of the disk media where the wedge is written. Defects such as radial scratches may happen during any of the disk manufacturing steps. If the self servowriting scheme chooses the same position to rewrite the failed final wedge every time, the media defects may be encountered repeatedly and consequently cause the retry attempt of servowriting the failed wedge to fail again.

One embodiment of the current invention deals with this problem by shifting the position of the final wedge during at least one servowriting retry attempt. Since a final wedge position different from a previous self servowriting attempt is adopted, potential defects on the surface of the media can possibly be avoided and the success rate of the servowriting retry attempt can be improved.

Figure 13:
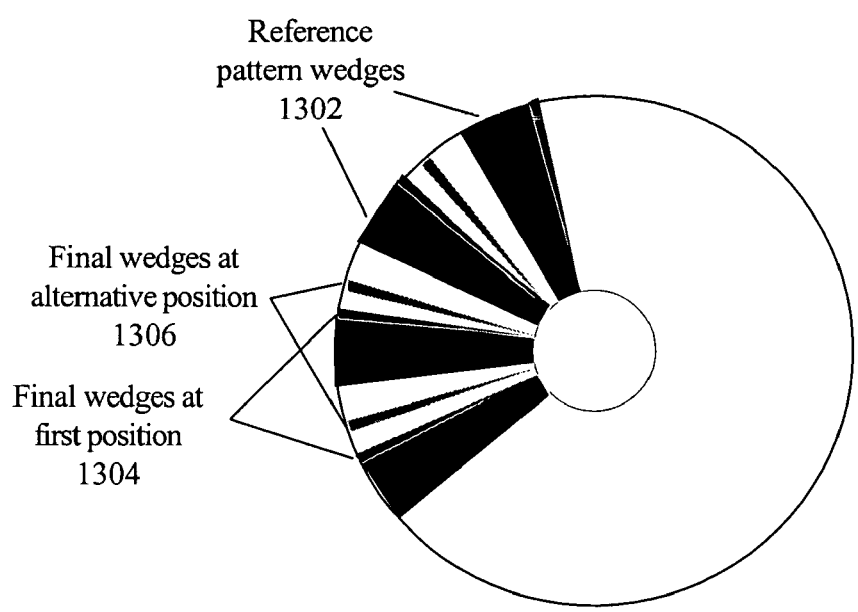
FIG. 13 is a diagram showing a portion of a reference pattern that can be used in the system of FIG. 1.

FIG. 13 shows an exemplary reference media pattern as well as an exemplary final pattern with various servowriting positions in accordance with embodiments of the present invention. The reference pattern may include one or more servo wedges such as wedges 1302, wherein the entire pattern may take up to 50% of the space available on the surface of the media. On the contrary, the final pattern (also comprised of one or more wedges) may only take 7% of the space on the media, making it possible to servowrite a wedge in the final pattern at multiple positions between adjacent wedges of the reference pattern. 1304 and 1306 show final wedges servowritten at different positions during the first and subsequent servowriting attempts.

Figure 14:
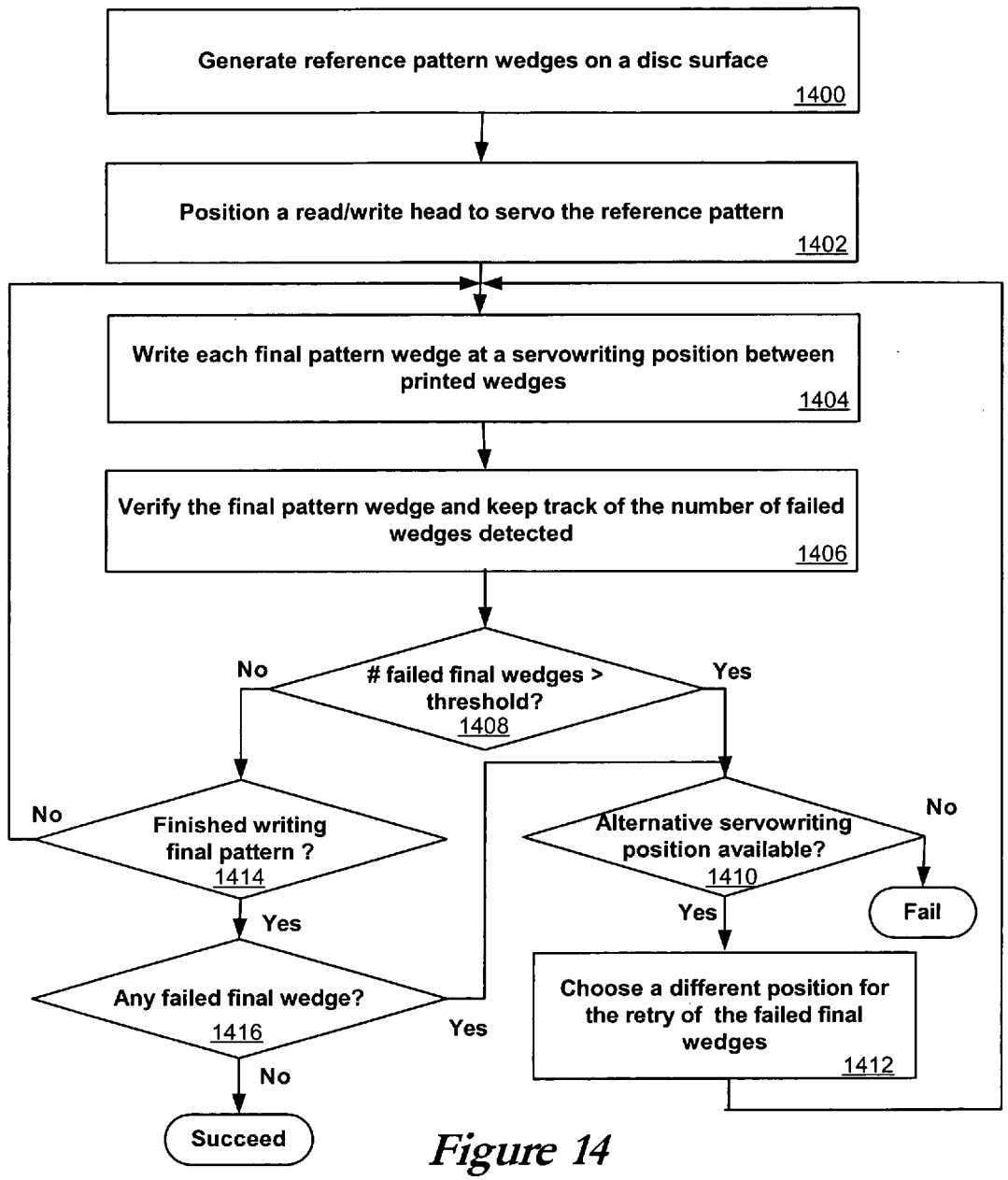
FIG. 14 is a flowchart showing a process that can be used with the system of FIG. 1.

An exemplary self-servowriting process using different wedge positions during retry attempts is shown in FIG. 14. Wedges of a reference servo pattern can be generated on a disk surface at step 1400. A read/write head can be positioned to servo the wedges of the reference pattern at step 1402, and each wedge of the final pattern can be written at a position between the wedges of the reference pattern at step 1404. The final wedge just written can then be verified and the number of wedges failed so far can be detected and recorded at step 1406. If the number of failed final wedges exceeds a pre-set threshold at step 1408, and it is determined that there is alternative position available between the reference wedges to retry the servowriting of the final wedges at step 1410, the current servowriting process will stop and a different position between the reference wedges will be chosen at step 1412 to retry servowriting the final pattern. If the number of failed wedges does not exceed the threshold and the servowriting process is un-finished at step 1414, the servowriting of the current final pattern may continue at step 1404. Otherwise, the process starting from step 1410 will be executed if there is any failed final wedge at the completion of the current servowriting process at step 1416.

There can be multiple options available when choosing a different position to retry servowriting the final wedge failed at the first attempt. One possible option is to choose a position as far away from the first position as possible in order to avoid hitting the same disk defects again. Since the disk defects are typically randomly distributed on the surface of the media, there is no guarantee that the new position can have less chance of hitting a defect than the previous one. Another option is to choose a position close to the first attempt so that in case the retry attempt fails again, other alternative retry positions may still be found.

Note that the wedges in the final pattern are preferred to be spaced between each other uniformly, rather than non-uniformly. Otherwise, the amount of time between final pattern wedges encountered by a read element may vary, causing a disk in a drive to exhibit so called timing eccentricity in addition to radial runout and making it more difficult to format the drive. Therefore, when any failed final wedge is re-written at an alternate position between a pair of reference wedges, wedges in the rest of the final pattern may also need be re-written at the new position between the corresponding reference wedges so that all final wedges may still be uniformly spaced between each other.

MR Bias

Since PES noise on the printed surface can be a significant problem, it can be desirable to use the highest safe MR bias, or the highest allowable amount of current that goes through a magneto-resistive (MR) sensor on an MR head. Increasing the MR bias can improve the ability of a read element to properly detect and read servo information, as the signal strength can be increased. Similar advantages can be obtained when using an increased MR bias while writing servo information. Systems can use the highest reasonable MR bias on the reference head while servoing on the printed media surface. This can be undesirable however, as higher MR biases can have a greater probability of causing a head failure. The failure of a head can be due to, for instance, electro-migration. Head failure can also result from high temperatures, as maintaining an MR stripe at a high temperature for a significant period of time can degrade performance. The tradeoff between higher probability of head failure and higher PES noise can lead to an intermediate MR bias applied to a head. In some embodiments, a higher MR bias can be applied during the self-servowrite process since the process can take on the order of only a few hours. Further, less time is spent writing the intermediate wedges in a two-step process, such that it can be acceptable to use a slightly higher MR bias during that time. Various methods can be used in accordance with other embodiments in order to prolong the life of an MR head, such as switching heads while the drive is idling, or turning off the MR bias between wedges when not reading data.

Although embodiments described herein refer generally to systems having a read/write head that can be used to write bursts on rotatable medium (magnetic media), similar advantages can be obtained with other such data storage systems or devices. For example, a laser writing information to an optical media can take advantage of additional passes when writing position information. Any media, or at least any rotatable media in a single and/or multi-headed disk drive, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method to support retry of self-servowriting, comprising:
   generating a reference pattern on a surface of a rotatable medium having a plurality of servo tracks operable to store at least a reference pattern and a final pattern, wherein both the reference pattern and the final pattern can include one or more wedges;
   positioning a read/write head relative to the surface of the rotatable medium;
   servoing on the one or more wedges in the reference pattern via the read/write head;
   writing each of the one or more wedges of the final pattern at a first position on the surface of a rotatable medium via the read/write head; and
   rewriting at least one of the one or more wedges of the final pattern at a second position if (1) a wedge written at the first position fails and/or (2) one or more conditions are met.

2. The method according to claim 1, wherein:
   the self-servowriting can use replication and/or propagation techniques.

3. The method according to claim 1, wherein:
   the rotatable medium can be a magnetic disk, an optical disk, laser-recordable disk, a disk in a single and/or multi-headed disk drive, or a rotatable data storage device.

4. The method according to claim 1, wherein:
   the read/write head can include:
   a read element operable to read the printed media and/or final pattern; and
   a write element operable to write the printed media and/or final pattern.

5. The method according to claim 1, wherein:
the reference patter can be a printed media pattern or a spiral pattern.

6. The method according to claim 1, wherein:
a wedge in the one or more wedges in the final pattern can be smaller in size than a wedge in the one or more wedges in the reference pattern.

7. The method according to claim 1, wherein:
the final pattern can have essentially the same or higher number of wedges than the reference pattern.

8. The method according to claim 1, wherein:
the one or more wedges in the final pattern can be spaced uniformly between each other.

9. The method according to claim 1, further comprising:
rewriting the one or more wedges of the final pattern at the second position at a different MR bias than at the first position.

10. The method according to claim 1, wherein:
each of the one or more rewriting conditions can be one of:
the number of failed wedges at the first position exceeds a pre-set threshold; and
the writing of the final pattern is completed.

11. The method according to claim 1, further comprising:
determining the position of the second position based on at least one of the following factors:
avoiding a defect on the surface of the medium; and
making multiple positions available for rewriting the wedge.

12. A system for printed media self-servowriting, comprising:
a rotatable medium including a surface having a plurality of servo tracks operable to store at least a reference pattern and a final pattern, wherein both the reference pattern and the final pattern can include one or more wedges;
a read/write head including:
a read element operable to read at least one of the reference pattern and the final pattern; and
a write element operable to write at least one of the reference pattern and the final pattern; and
one or more controllers operable to:
position the read/write head relative to the surface of the rotatable medium;
servo on the one or more wedges in the reference pattern via the read/write head;
write each of the one or more wedges of the final pattern at a first position on the surface of a rotatable medium via the read/write head; and
rewrite at least one of the one or more wedges of the final pattern at a second position if (1) a wedge written at the first position fails and/or (2) one or more conditions are met.

13. The system according to claim 12, wherein:
the self-servowriting can use replication and/or propagation techniques.

14. The system according to claim 12, wherein:
the rotatable medium can be a magnetic disk, an optical disk, laser-recordable disk, a disk in a single and/or multi-headed disk drive, or a rotatable data storage device.

15. The system according to claim 12, wherein:
the reference pattern can be a printed media pattern or a spiral pattern.

16. The system according to claim 12, wherein:
a wedge in the one or more wedges in the final pattern can be smaller in size than a wedge in the one or more wedges in the reference pattern.

17. The system according to claim 12, wherein:
the final pattern can have essentially the same or higher number of wedges than the reference pattern.

18. The system according to claim 12, wherein:
the one or more wedges in the final pattern can be spaced uniformly between each other.

19. The system according to claim 12, wherein:
the one or more controllers is further operable to rewrite the one or more wedges of the final pattern at the second position at a different MR bias from at the first position.

20. The system according to claim 12, wherein:
each of the one or more rewriting conditions can be one of:
the number of failed wedges at the first position exceeds a pre-set threshold; and
the writing of the final pattern is completed.

21. The system according to claim 12, wherein:
the one or more controllers are further operable to determine the position of the second position based on at least one of the following factors:
avoiding a defect on the surface of the medium; and
making multiple positions available for rewriting the wedge.

22. A system for printed media self-servowriting, comprising:
means for generating a reference pattern on a surface of a rotatable medium having a plurality of servo tracks operable to store at least a reference pattern and a final pattern,
wherein both the reference pattern and the final pattern can include one or more wedges;
means for positioning a read/write head relative to the surface of the rotatable medium;
means for servoing on the one or more wedges in the reference pattern via the read/write head;
means for writing each of the one or more wedges of the final pattern at a first position on the surface of a rotatable medium via the read/write head; and
means for rewriting at least one of the one or more wedges of the final pattern at a second position if (1) a wedge written at the first position fails and/or (2) one or more conditions are met.

* * * * *